(12) United States Patent
Li et al.

(10) Patent No.: US 9,691,050 B2
(45) Date of Patent: Jun. 27, 2017

(54) REAL-TIME PAGE AND FLOW COMPOSITIONS

(75) Inventors: WenHua Li, Palo Alto, CA (US); Nathan Angstadt, Colorado Springs, CO (US); Chifai Kan, Dubline, CA (US); Helen S. Yuen, Summit, NJ (US); Sundeep Nayak, Fremont, CA (US); Yung-Chang Chen, San Leandro, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1580 days.

(21) Appl. No.: 12/408,073

(22) Filed: Mar. 20, 2009

(65) Prior Publication Data

US 2010/0242049 A1    Sep. 23, 2010

(51) Int. Cl.
*G06Q 10/10* (2012.01)

(52) U.S. Cl.
CPC .................................. *G06Q 10/10* (2013.01)

(58) Field of Classification Search
CPC .......... G06F 17/3089; G06F 17/30893; G06Q 10/10
USPC .......................................................... 705/1.1
See application file for complete search history.

(56) References Cited

U.S. PATENT DOCUMENTS

| 7,167,863 | B2 * | 1/2007 | Ellis ................. G06F 17/30893 |
| 7,401,289 | B2 * | 7/2008 | Lachhwani et al. .......... 715/243 |
| 9,208,241 | B2 * | 12/2015 | Sullivan ............ G06F 17/30873 |
| 2005/0033717 | A1 * | 2/2005 | Ellis et al. ........................ 707/1 |
| 2007/0113191 | A1 * | 5/2007 | Keller ................... G06F 3/0481 715/752 |
| 2007/0261005 | A1 * | 11/2007 | Kreiner ......................... 715/830 |
| 2009/0178026 | A1 * | 7/2009 | Mital et al. ................... 717/120 |
| 2009/0228775 | A1 * | 9/2009 | Sullivan ............ G06F 17/30873 715/205 |

* cited by examiner

*Primary Examiner* — Carrie S Gilkey
(74) *Attorney, Agent, or Firm* — Omkar K. Suryadevara; Sillicon Valley Patent Group LLP

(57) ABSTRACT

Task flows are utilized for real-time page compositions, real-time flow compositions, or both. At design time, a plurality of task flows are provided as a database or library. A manager, or other type of user, can associate task flows with dynamic regions in an application page being designed. The application page can include one or more dynamic regions that act as a container for task flows. Metadata is generated from the customization of input parameters. At runtime, application pages are generated on-the-fly for display in a user interface. The application pages are composed according to the task flows embedded therein. The application pages are presented to the user according to an application flow. Through a user interface, the user can enter and retrieve information related to governance, risk, and compliance (GRC) activities, or other types of activities.

20 Claims, 13 Drawing Sheets

850

| Edit Task Flow Binding | ✕ |

Task Flow:/WEB-INF/oracle/apps/grc/framework/risks/flow/ProposedRiskCreatePFFlow.xml#ProposedRiskCreatePFFlow ⊟ Input Parameters

| Name | Value |
| --- | --- |
| ObjectTypeCode | #{"GRC_PROPOSED_RISK"} |
| ObjectKey | #{pageFlowScope.ObjectKey} |
| ContainerPageCode | #{"GRC_PROPOSEDRISKCREATEPG"} ▼ |
| ModuleCode | #{pageFlowScope.ModuleCode} |

Apache Ant - Log | task-flow-definition - ProposedRiskCreatePFFlow - Property Inspector

| Common | ⊟ Input Parameter Definitions | | |
| --- | --- | --- | --- |
| Description | name* | class | value |
| Managed Beans | ObjectTypeCode | | #{pageFlowScope.ObjectTypeCode} |
| Parameters | ObjectKey | | #{pageFlowScope.ObjectKey} |
| Behavior | ContainerPageCode | | #{pageFlowScope.ContainerPageCode} |
| Security | ModuleCode | | #{pageFlowScope.ModuleCode} |

*FIG. 8F*

REAL-TIME PAGE AND FLOW COMPOSITIONS

BACKGROUND OF THE INVENTION

This invention generally relates to software, and more specifically, to utilizing task flows for development of enterprise software applications.

Software applications are typically distributed among many end customers having diverse needs. As a result, the applications are designed for general use. An expert such as a software engineer is employed in order to customize the application for a specific use. Problematically, the software engineer usually lacks familiarity with the business processes of an organization to effectively modify the software. Furthermore, the expert raises an additional expense for software deployment. On the other hand, while a business manager has familiarity with the business processes, the manager likely lacks the software expertise to implement the processes.

Moreover, even when an application is hard coded to meet the needs of an organization, there is sometimes little flexibility for changes. The pages of an application are hard coded at design time with static components. By the time an application is run, the design may no longer be appropriate. In this case, the application is taken off-line to update the page design. The downtime causes a loss in productivity and additional expense from the expert.

Conventional GRC (governance, risk management, and compliance) applications are for general use, as described. In general, governance relates to creation and distribution of company policies, risk management is concerned with the risk tolerance of a company, and compliance refers to enforcement of the policies. The conventional GRC applications are ineffective as general applications due to the difference between company policies, the difference between GRC areas, and the like. Additionally, there are constant changes among GRC activities of a company.

As can be appreciated, it is desirable for an application to provide a mechanism allowing customization without expertise. The solution should decouple design time aspects from runtime aspects of designing application pages for the user interface.

BRIEF SUMMARY OF THE INVENTION

A method, system, and computer program product for using task flows for real-time page compositions, real-time flow compositions, or both. At design time, a plurality of task flows is provided as a database or library. A task flow provides a modular approach for defining control flow in an application and can be controlled by a routing diagram built by a user. In one embodiment, a task flow defines activities performed for regulatory compliance. One type of compliance that makes use of task flows is GRC (governance, risk management, and compliance) activities. A manager, or other type of user, can associate task flows with dynamic regions in an application page being designed. The application page can include one or more dynamic regions that act as a container for task flows. Metadata is generated from the customization of input parameters.

At runtime, application pages are generated on-the-fly for display in a user interface. The application pages are composed according to the task flows embedded therein. The application pages are presented to the user according to an application flow which renders business logic as defined by the metadata. Through a user interface, the user can enter and retrieve information related to GRC activities, or other types of activities.

In an implementation, the system includes a page template library. The page template library includes any number of page templates that are specific to an industry. In a specific implementation, the system includes sets of governance, risk, and compliance (GRC) page templates that are specific to an industry. Thus, a feature of the invention provides out of box GRC specific page templates. Users are also allowed to enter, create, or modify their own page template.

The system may further include a user interface component library. The user interface component library can provide out of box and reusable user interface components that are specific to an industry. For example, the user interface components may include GRC components where the components are specific to an industry. Users are also allowed to enter, create, or modify their own user interface component.

In a specific implementation, the system includes modules and graphical interfaces for page and flow composition administration. This allows domain-experts or business users to construct the page or flow by choosing from any number of page templates, user interface components, or both from the library.

Thus, a feature of the invention allows nonprogrammers or nondevelopers such as domain experts and business users to compose the page, flow, or both without having to use an integrated development environment (IDE) tool. The reusable page templates, user interface components, or both may be created by developers using an IDE tool.

The system may further include a real-time composition processing engine. The system may include a runtime engine that loads and process the page, flow, or both which has been built by the domain experts or business users.

In a specific implementation, the system includes a preview feature (e.g., preview framework). The preview feature simulates the real-time behavior of the page, flow, or both before the page or flow is published.

Other benefits and features of the system include:

Real time Page and Flow Composition. Some advantages of this feature includes, for example, allowing business user to construct the page and flow; avoiding the need to translate the requirement between domain expert and technical consultant; avoiding the need to shutdown the application to reflect the page and flow change; minimizing the understanding needed to use an IDE tool; and minimizing redeployment of the application.

In a feature of the invention, business users can use different pre-built user interface components as Lego pieces or building blocks to construct the page and flow without being confused with technical difficulties. The system can be easily configured to satisfy the different GRC domains such as information technology (IT) governance, environment regulation, financial compliance, and so forth.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 8A-8E are schematic diagrams illustrating screen shots associated with task flow binding, according to one embodiment of the present invention. FIG. 8F illustrates an additional screenshot in certain embodiments.

DETAILED DESCRIPTION OF THE INVENTION

Figure 1:
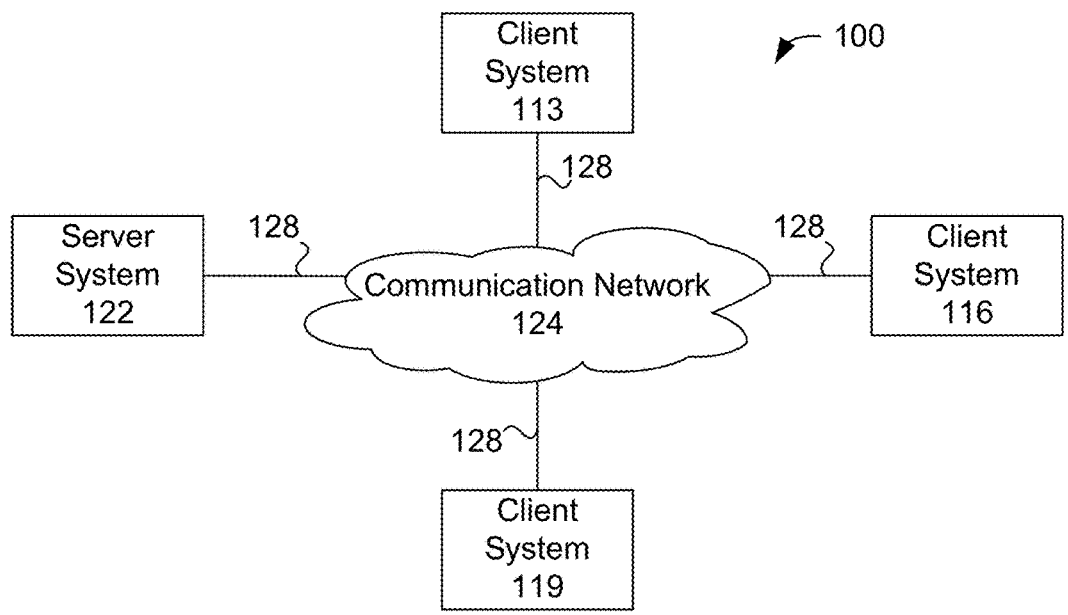
FIG. 1 shows a block diagram of a client-server system and network, according to one embodiment of the present invention.

FIG. 1 is a simplified block diagram of a distributed computer network 100 which may include an implementation of the present invention. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
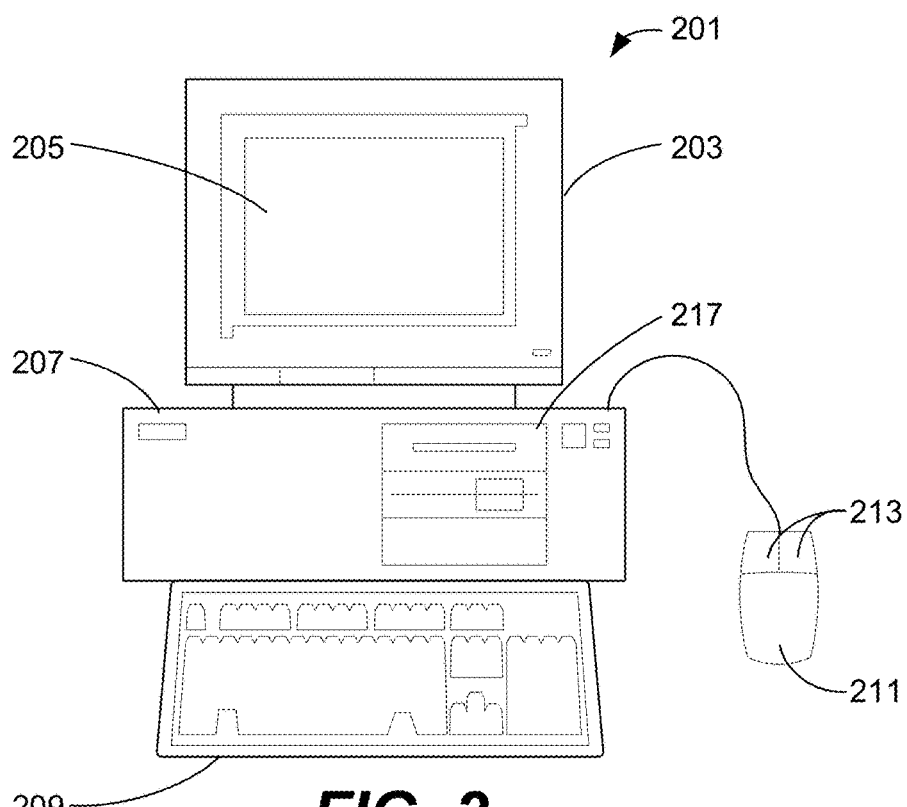
FIG. 2 shows a more detailed diagram of an exemplary client or computer, according to one embodiment of the present invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
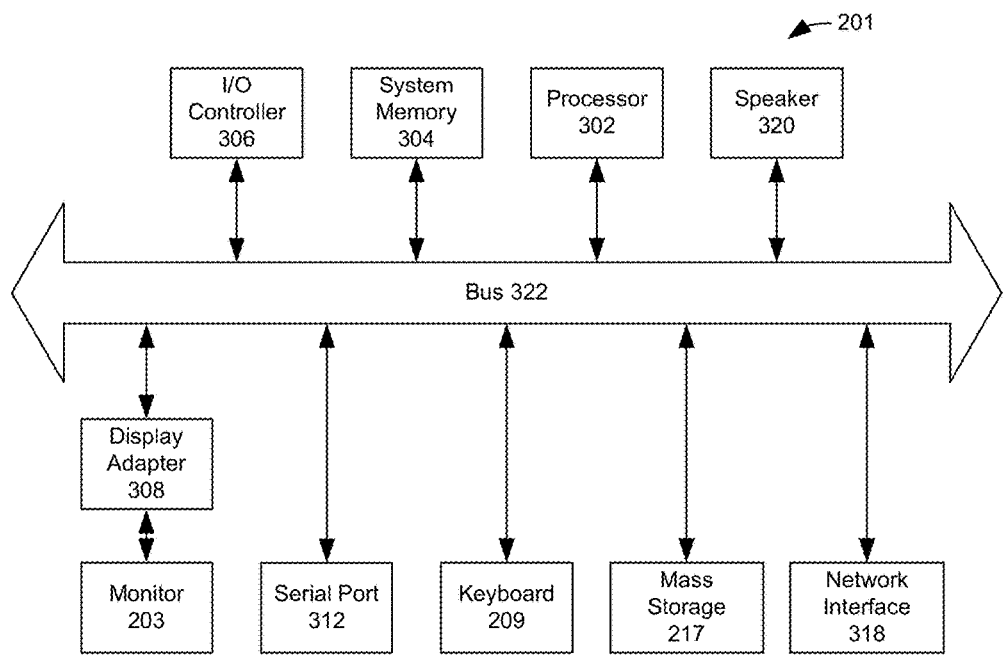
FIG. 3 shows a system block diagram of a client computer system used to provide a user interface, according to one embodiment of the present invention.

FIG. 3 shows a system block diagram of computer system 201 which may be used to execute software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
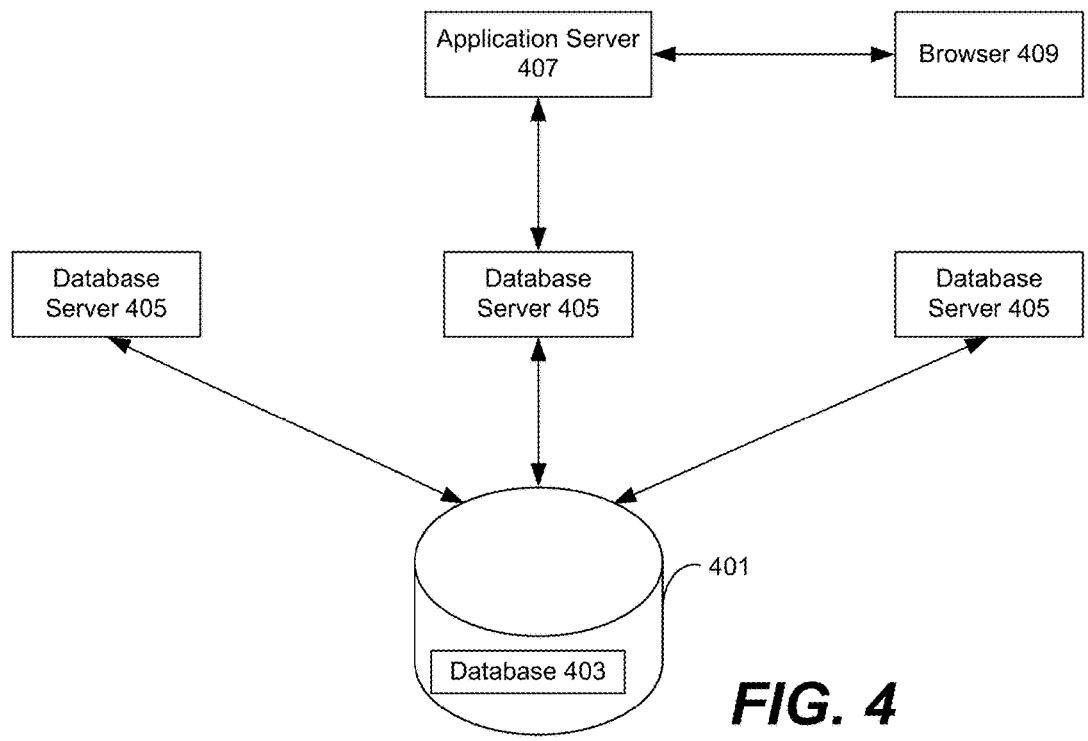
FIG. 4 shows data source or data service in the form of a database system, according to one embodiment of the present invention.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
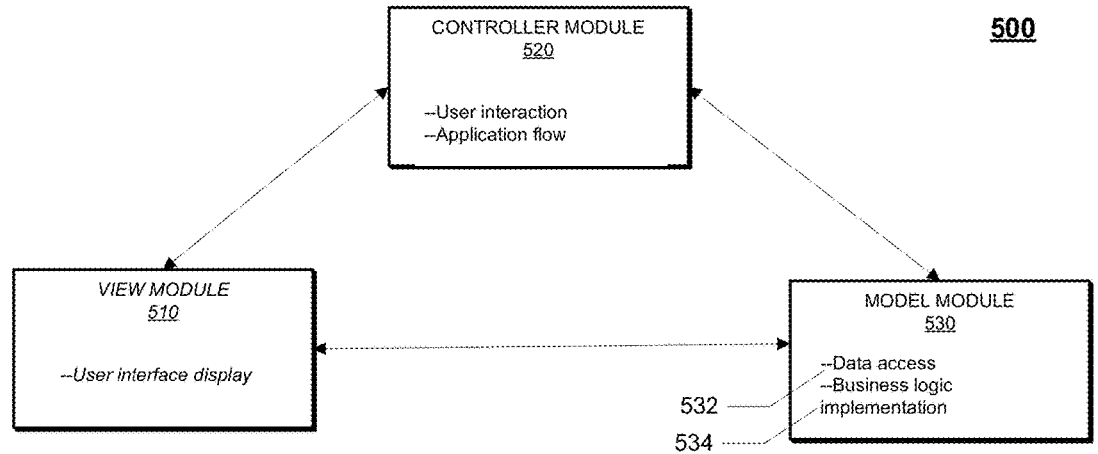
FIG. 5 is a block diagram illustrating an application to construct application pages that incorporate business needs of an entity, according to one embodiment of the present invention.

FIG. 5 is a block diagram illustrating an application 500 to construct application pages that incorporate business needs of an entity, according to one embodiment of the present invention. The application 500 includes a view module 510, a controller module 520, and a model module 530. In one embodiment, the application 500 can be a GRC application operating according to Oracle ADF (application development framework) from Oracle Corporation of Redwood Shores, Calif. Oracle ADF provides for rapid development of enterprise applications. Each of the modules 510, 520, 530 is in communication through software interfaces (e.g., APIs). The grouping of functionality represented by modules 510, 520, 530 are merely one exemplary configuration of the application 500. Methods implemented within the application 500 are described below.

The view module 510 provides a user interface display to the application 500. The view module 510 can also raise events to the controller module 520 as invoked through the user interface (e.g., user interactions). One component displayed by the view module 510 is an application page. In one embodiment, the application page can be viewed remotely as a web page using a URL (universal resource locator). The application page can be built using a development application. The application page is generated on-the-fly during runtime, from a predefined task flow, as described in greater detail below.

The controller module 520 manages user interaction and application flow, as defined by a task flow. More specifically, the controller module 520 processes user input, handles errors and decides what application page should be presented to the user. The application flow can also be built in Oracle JDeveloper. Oracle JDeveloper provides a development environment for Java-based service-oriented architecture (SOA) applications and user interfaces. The application flow is defined by the pages and logic that interact to allow the user to complete a task. At design time, the pages and page fragments that make up a task in the application flow are added as activities or view activities. When the user navigates from one application page to another within the application flow, the user is transitioning from one activity to another.

The model module 530 comprises a data access module 532 and a business service (or business logic implementation) module 534. The data access module 532 provides access to metadata that defines the application flow. The business service module 534 customizes the application flow according to specified business needs.

Figure 6:
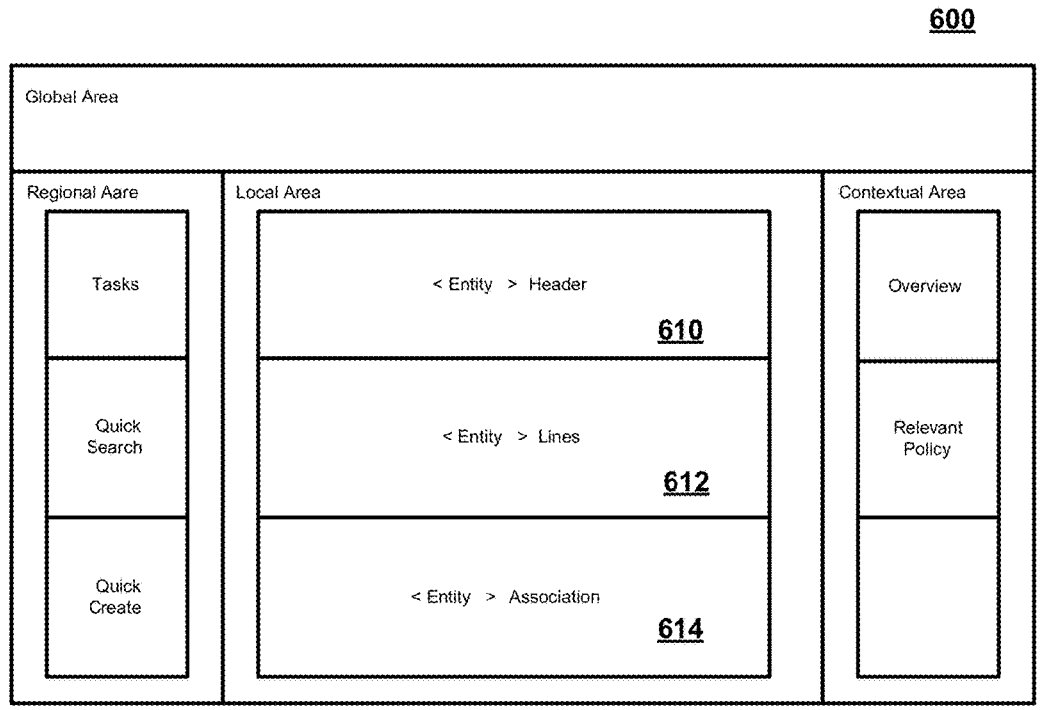
FIG. 6 is a schematic diagram illustrating an example of an application page.
Figure 14A:
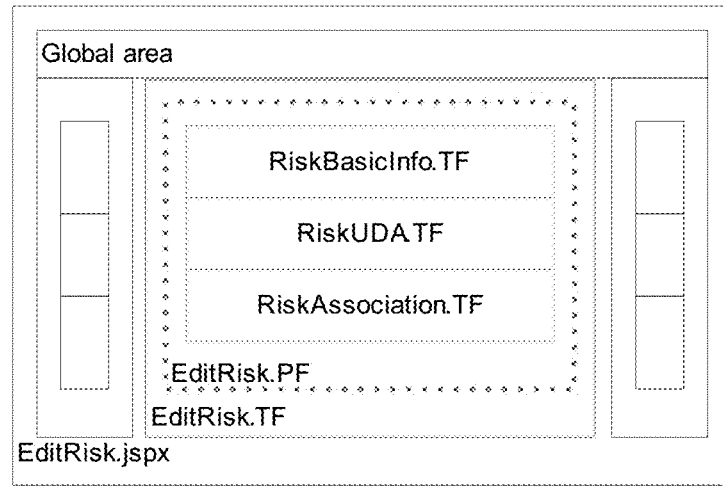
FIGS. 14A and 14B are schematic diagrams illustrating further examples of dynamic regions, according to one embodiment of the present invention.
Figure 14B:
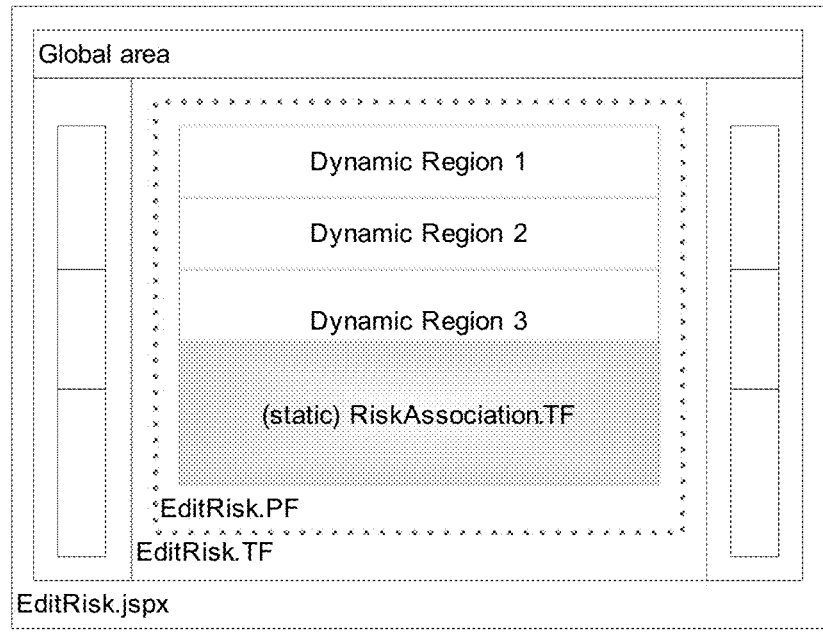

FIG. 6 is a schematic diagram illustrating an example of an application page 600. The application page 600 includes three dynamic regions 610, 612, 614, but an application page can include any number of dynamic regions. The dynamic regions 610, 612, 614 are configured to host a component having an entity association. An application can determine at runtime which contents are to be rendered within the dynamic regions 610, 612, 614 based on defined metadata. In one embodiment, task flows are rendered within the dynamic regions 610, 612, 614 at runtime, as described in more detail below. In one embodiment, inner regions can be nested within one or more of the dynamic regions 610, 612, 614. Other components, such as action buttons can be defined (e.g., cancel, save, and submit buttons). The application page can be created in an IDE (integrated development environment) application such as JDeveloper by Oracle Corporation. FIGS. 14A and 14B are schematic diagrams illustrating further examples of dynamic regions.

Figure 7:
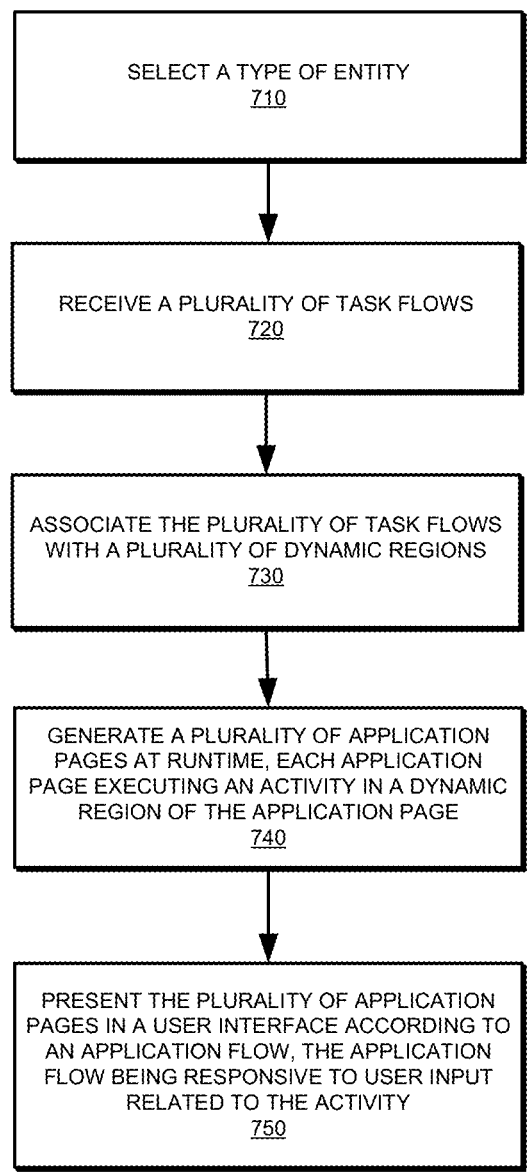
FIG. 7 is a flow chart illustrating a method 700 for constructing application pages using task flows related to a business process, according to one embodiment of the present invention.

FIG. 7 is a flow chart illustrating a method 700 for constructing application pages using task flows related to a business process, according to one embodiment of the present invention. At a high-level, task flows and user input dictate a flow of application pages presented to a user that is specific to the business process. The example business process of regulatory compliance referred to herein is just one possible implementation of the method 700. The method can be implemented in, for example, the system 500 of FIG. 5 (e.g., in controller module 520).

Figure 13:
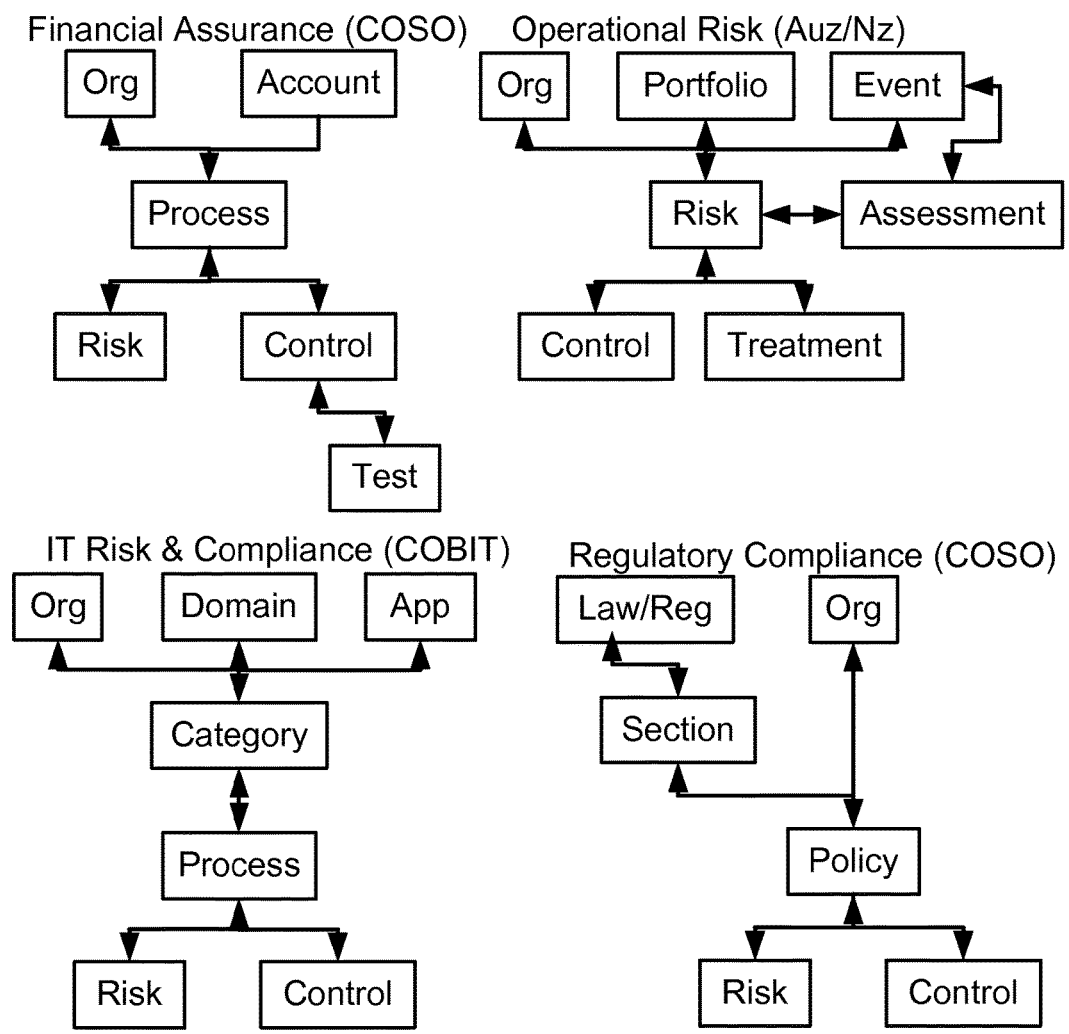
FIG. 13 illustrates examples of different models that can be used by various types of customers, according to one embodiment of the present invention.

At design time, a type of entity is selected 710. An IDE application can be used for application design. The entity type allows a customer to configure task flow by business focus. The entity may be selected from a library of entity types. FIG. 13 illustrates examples of different entity types or models that can be used by various types of customers. Exemplary entity types include financial assurance (COSO or Committee of Sponsoring Organizations of the Treadway Commission), operational risk (Aus/Nz or Australian/New Zealand Risk Management Standard), IT risk and compliance (COBIT or Control Objectives for Information Technology), regulatory compliance (COSO), and the like.

Exemplary entity types for GRC include risk, control, response, and the like. The business performs activities to comply with the various aspects of GRC. Consequentially, a GRC application addresses the needs of governance, risk management and compliance. Governance defines mechanisms for an entity to establish policy and to enforce policy. Risk management is a process for identifying risk and for determining risk tolerance for an entity. Compliance is a process for recording policies and procedures. Thus, the GRC application can provide computer assistance in tracking GRC-related activities in an entity. In one embodiment, the GRC application is customized with business rules that are specific to an entity type.

In a specific implementation an entity type includes any number of page templates specific to that entity type (e.g., specific to a particular industry or set of tasks). Examples of different industries include financial, construction, insurance, health care, and so forth. A user can also create their own page templates. For example, a user can create a page template by modifying an existing page template or create an entirely new page template.

The user can add or delete a user interface component (e.g. button, form, window, subwindow, pane, list, or the like), change an existing workflow, or both. The user interface component can be selected from a library of user interface components and can be reused in other page templates. The user interface components may be specific to a particular industry. Users can also create their own user interface components.

A plurality of task flows is received 720. A task flow provides a modular approach for defining control flow in an application and can be controlled by a routing diagram built by a user. In one embodiment, a task flow defines a plurality of activities performed for regulatory compliance (e.g., GRC compliance). In other embodiments, a task flow can relate to a set of activities for meeting a goal. Various task flows can be preprogrammed according to a goal, or a milestone in reaching a goal. A user can generate custom task flows and save for repeated use. The task flows can be stored remotely in a database and be accessible using a URL, or as a local library. The task flows can be received by being displayed to a user for selection, such as in a drop down box.

Also during design time, the plurality of task flows is associated (or bound) 730 with a plurality of dynamic regions to design an application flow. A user assigns a task flow to a dynamic region of an application page. The dynamic region acts as a container for the task flow execution. Other dynamic regions can be added to or deleted from the application page. Additionally, the dynamic regions can be rearranged and sized on the application page in a visual manner. In one example, a user activates a dynamic region by double clicking with a mouse. Once active, the user can select an appropriate task flow.

In another embodiment, a dynamic region in the application page is generated by dragging and dropping a task flow onto the application page or page fragment. A user can then designate a region as a dynamic region. A wizard can bind the dynamic region to a method from a bean such as PageComposer Bean. As a result, an application flow is generated for use during runtime when a method is invoked. A single task flow is reusable as the task flow can be assigned to more than one dynamic region.

An example of task flow binding is illustrated in FIGS. 8A-D. In this embodiment, a managed bean links an application flow to a dynamic region of the application page. The managed bean is registered in the project (e.g., adfc-config.xml) as shown in a screenshot 810 of FIG. 8A. In a specific implementation, a page as shown in screenshot 810 includes a top pane and a bottom pane. The top pane includes a first set of tabs along a bottom edge of the top pane. The first set of tabs include tab labels including Diagram, Source, Overview, and History. The bottom pane includes a second set of tabs along a top edge of the bottom pane. The second set of tabs include tab labels including Messages—Log, Property Inspector, and Pending Changes.

The top pane includes a menu along a left edge of the top pane including options such as Common, Description, Activities, Control Flows, and Managed Beans which has been selected. The Overview tab has also been selected. Thus, the top pane shows a summary view or overview of the managed beans. The managed beans are displayed in a table. A first column of the table includes names of the managed beans (e.g. FlowComposer and PageComposer). A second column of the table identifies a class. A third column of the table identifies a session.

Referring now to the bottom pane, the Property Inspector tab has been selected for the managed bean "PageComposer." The Property Inspector tab includes a menu along a left edge of the bottom pane including options such as Common and Description. The option "Common" has been selected and the bottom pane includes a list of properties for the managed bean "PageComposer." The list of properties include managed-bean-name, managed-bean-class, and managed-bean-scope.

Figure 8A:
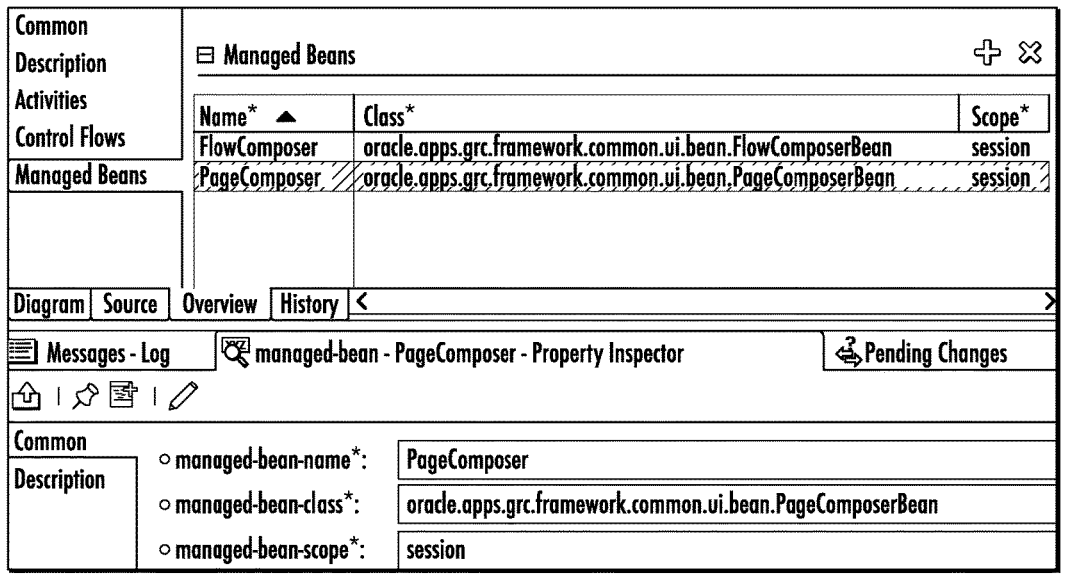
Figure 8B:
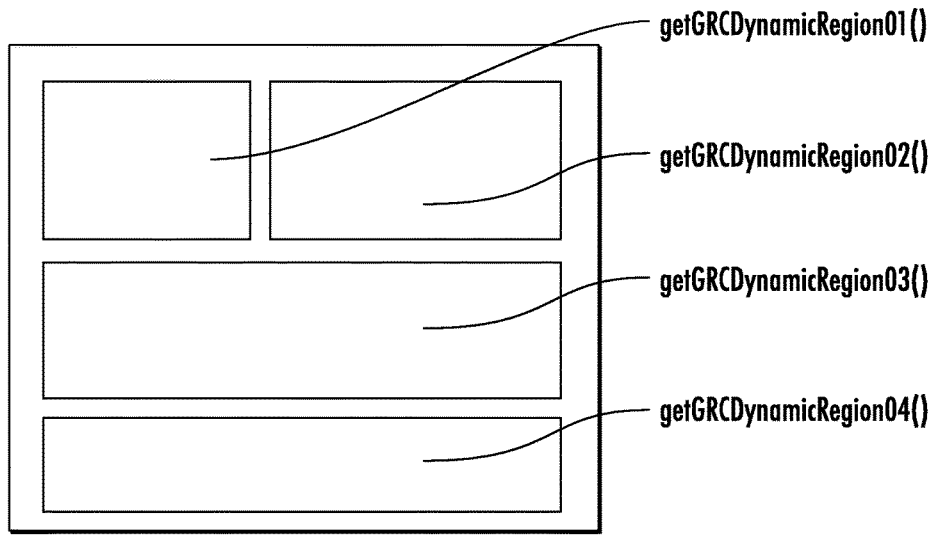

The dynamic regions reference methods (e.g., getGRCDynamicRegion01 for a first dynamic region) as shown in an application page 820 of FIG. 8B. In one embodiment, a protocol for numbering dynamic regions dictates the order of left-to-right, and then top-to-bottom. However, it should be appreciated that any numbering protocol may be used (e.g., right-to-left and then top-to-bottom).

Figure 8C:
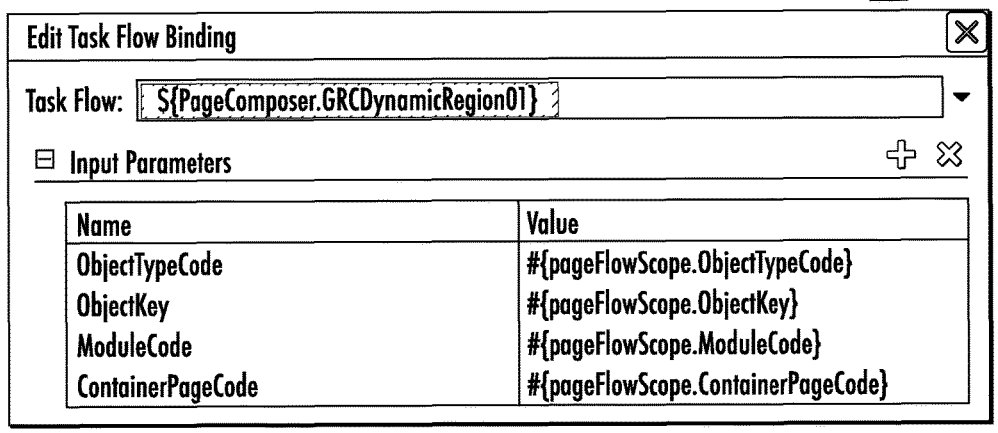
Figure 8D:
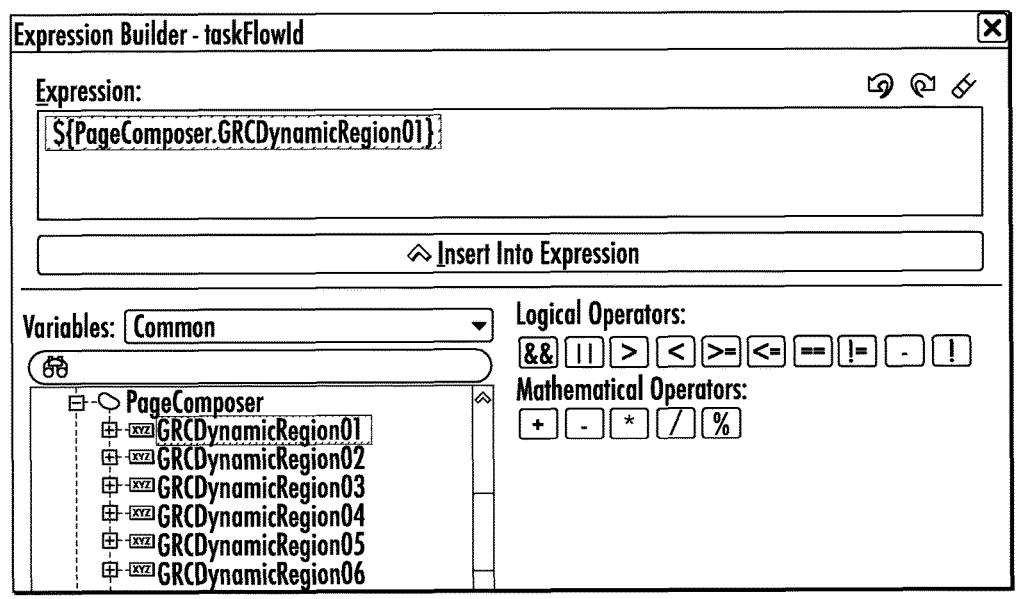

FIGS. 8C and 8D illustrates screenshot 830, 840 for editing the task flow binding to the first dynamic region of an application page. An Edit Task Flow Binding dialog box as shown in screenshot 830 includes a text box displaying the name of the task flow and a table of input parameters below the text box. In this specific implementation, there are four task flow input parameters in the table. A first column of the table includes input parameter names. A second column of the table includes input parameter values. As shown in this example, the four task flow input parameters include ObjectTypeCode, ObjectKey, ModuleCode, and ContainerPageCode. Values for each of these input parameters are shown in the second column of the table.

In a specific embodiment, the ContainerPageCode parameter is hard coded. In another embodiment, the ContainerPageCode parameter can be varied using FlowComposerBean as shown in a screen shot 850 of FIG. 8E.

FIG. 8D shows an example of an Expression Builder dialog box as shown in screenshot 840. The dialog box includes top and bottom regions. The top region includes a text box for the expression. Below the text box is a button labeled Insert Into Expression.

The bottom region includes a drop-down list for the user to select the variables, a find or search tool, and a box below the search tool including a directory. A first level of the directory is labeled PageComposer. Within the first level of the directory are second level directories or the dynamic regions. The bottom region further includes a set of logical operator buttons and a set of mathematical operator buttons.

FIG. 8F is a screen shot 860 showing how to set the input parameters. A window or dialog box as shown in screen shot 860 includes a property inspector tab which has been highlighted. The property inspector tab includes a menu along a left edge of the tab pane. The menu includes options Common, Description, Managed Beans, Parameters, Behavior, and Security. As shown in this example, the option "Parameters" has been selected so that a region of the tab pane includes a table labeled Input Parameter Definitions. The table includes first, second, and third columns including input parameter names, classes, and values, respectively.

Metadata describes the behavior of and relationship between components on an application page. Metadata is stored in a database until runtime. The page level task flow definition defines the task flow for each entity transaction page fragment and the other reusable page fragments, as shown in Table A. The page composition definition defines the content of each entity page region, as show in Table B.

TABLE A

Example of page level task flow definition

| ATTRIBUTE | DESCRIPTION |
|---|---|
| Page Type | Identify whether it is entity transaction page fragment or region level page fragment |
| Page Code | Page identifier |
| Task Flow | Task flow name for the corresponding page fragment |

TABLE B

Example of Page composition definition

| ATTRIBUTE | DESCRIPTION |
|---|---|
| Page Code | Page identifier for entity transaction page fragment |
| Region Number | Specifies the region (e.g., 1 through 4 for a 4 region page) |
| Region Page Code | Specifies the page code identifier for the region |

One or more of an application developer, a professional service engineer, a user experience expert, or the like, can construct the application page. In one example of construction roles, the application developer creates application flows and composes pages, the professional service engineer composes pages and configures metadata, and the user experience expert handles page layouts and UI design in application flow view activities.

Optionally, user-level privileges can be set for an application page. For example, a user can be granted permission to view certain pages, but not others. Furthermore, the permissions can discriminate on a per dynamic region level or a per task flow level. Consequentially, a user can be granted permission to view certain task flows on the application page, but not others.

Referring again to FIG. 7, at runtime, a plurality of application pages is generated 740. In one embodiment, the application pages are generated on-the-fly as a user navigates from one application page to another. Based on a current state of task flows, an activity within a task flow is displayed on the application page. The flow of pages can be implemented by a managed bean (e.g., PageComposerBean).

Page composition at runtime uses metadata such as GRC page composition metadata. A method determines task flow regions on the application page using an input parameter (e.g., ContainerPageCode) and method index (e.g., GRCDynamicRegion method). GRC page composition metadata can store metadata in three tables, GRC_PAGE_COMPO- SITIONS, GRC_PAGE_DEFINITIONS_B and GRC_PAGE_DEFINITIONS_TL. The first two tables identify a task flow, and the third is for translation. In particular, the GRC_PAGE_COMPOSITIONS table can identify a region page code based on the ContainerPageCode and the region index. For example, a region page code of a dynamic region is determined, as shown in Table C. Then, a task flow is identified from the region page code, as shown in Table D.

TABLE C

| CONTAINER_PAGE_CODE | RE-GION_NUM | REGION_PAGE_CODE |
|---|---|---|
| GRC_MYGRCOVERVIEWPG | 1 | GRC_MYTASKSPF |

TABLE D

| PAGE_DEFINITION_CODE | TASK FLOW |
|---|---|
| GRC_MYTSKSPF | /WEB-INF/oracle/apps/grc/framework/common/flow/MyGRCTaskPFFFlow#MyGRCTasksPFFlow |

A button or other graphical component can receive user input, for example, to call a method launching a task flow (see source code below). Furthermore, live updates occurring while a user is running an application can be presented to a user when the application pages are generated in this manner. The application pages can be described using, for example, XML or HTTP source code.

The following source code is for a button that calls a method to launch a task flow:

```
<af:commandNavigationItem
    text="#{task.displayMessage}"    icon="/media/worklist/#
                                           {task.objectImg}"
    messageType="info"
    inlineStyle="text-decoration:none;"
    action="#{LocalAreaManagerBean.CallNextTaskFlow}">
    <af:setActionListener
        from="#{task.objectType}"
        to="#{requestScope.Code}"/>
    <af:setActionListener
        to="#{LocalAreaManagerBean.nextTaskFlowId}"
        from="/WEB
INF/oracle/apps/grc/framework/risks/flow/
RiskEditUsingTabFlow.xml#RiskEditUsingTabFlow"/>
```

Figure 10:
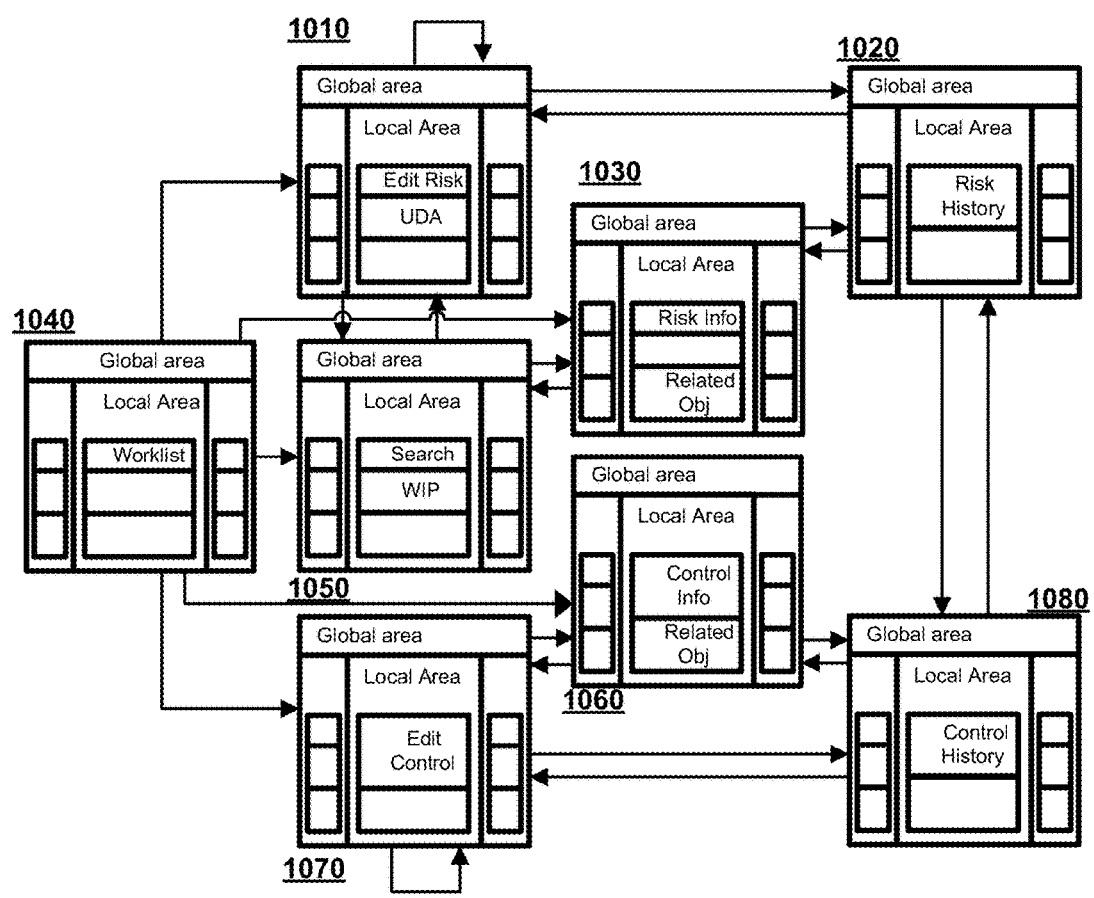
FIG. 10 is a schematic diagram illustrating an example of generating an application flow, according to one embodiment of the present invention.

At runtime, the plurality of application pages is presented 750 in a user interface according to an application flow. FIG. 10 is a schematic diagram illustrating an example of generating an application flow. In FIG. 10, various flows of the application are shown that are based on user input and metadata defined. For example, page 1040 is a page to show user's worklist, page 1010 is a page to modify an existing risk, page 1030 is a page to display risk information. Additionally, page 1020 is a page to display risk history, page 1050 is a page to display search information, page 1060 is a page to display control information, page 1070 is a page to display controls, and page 1080 is a page to display control history.

The arrows show the various paths of flow. For example, depending on the metadata defined by user, the same user action from page 1040 can be routed to either page 1010, to page 1030, to page 1050 or to page 1070. A user action from page 1010 can be routed to either page 1020, page 1050, or back to page 1010.

The application page can be a new page launched in an existing tab by replacing the existing content, or as a new tab. Either way, navigation to the new page is achieved by launching a bounded task flow in the existing or new tab. In one embodiment, a managed bean controls tab content and rendering (e.g., LocalAreaManagerBean). The application pages can be presented in a browser window (e.g., Internet Explorer), a desktop window, an application window, or the like. In one embodiment, a Java Virtual Machine is invoked for executing the task flows.

Figure 9:
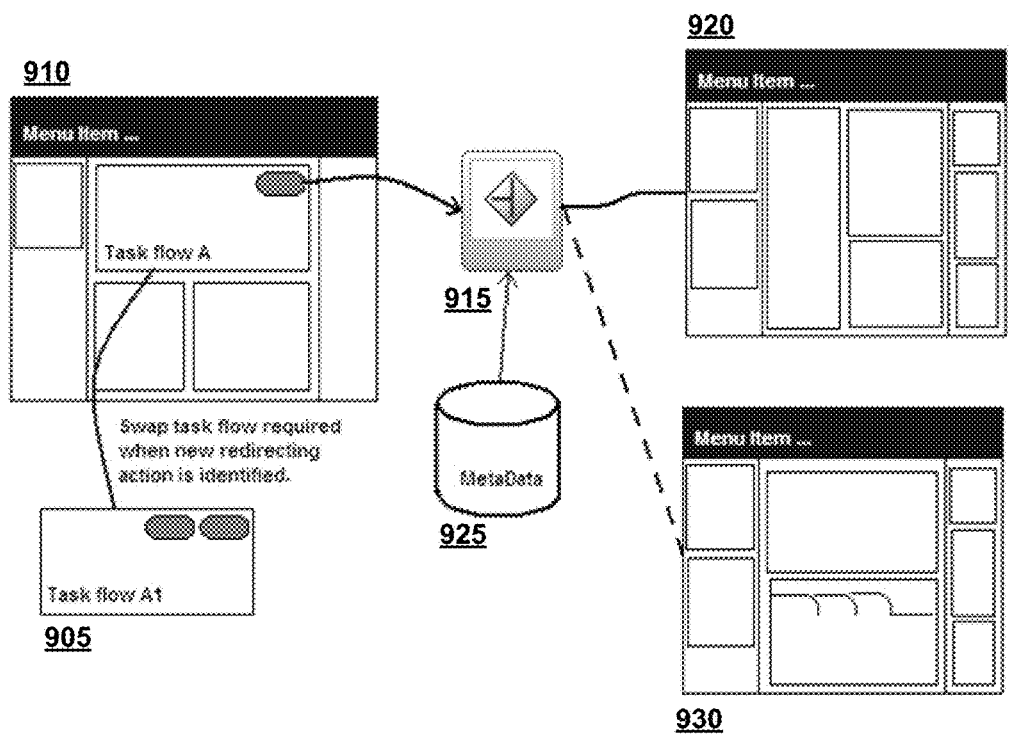
FIG. 9 illustrates one example of an application flow, according to one embodiment of the present invention.

FIG. 9 illustrates one example of an application flow as described above with respect to FIG. 10. Page 910 includes region 905 with an embedded task flow. After a user action, decision flow router 915 (e.g., can be contained within controller module 520) refers to metadata (e.g., user-defined metadata) 925 in deciding whether to proceed to page 920 or to page 930.

The application flow can be configured by an application developer, a professional service engineer, or a business analyst. An example of roles is for the application developer to create task flows, the professional service engineer to compose task flows and configure metadata, and the business analyst to identify business work flows for implementation.

Figure 11:
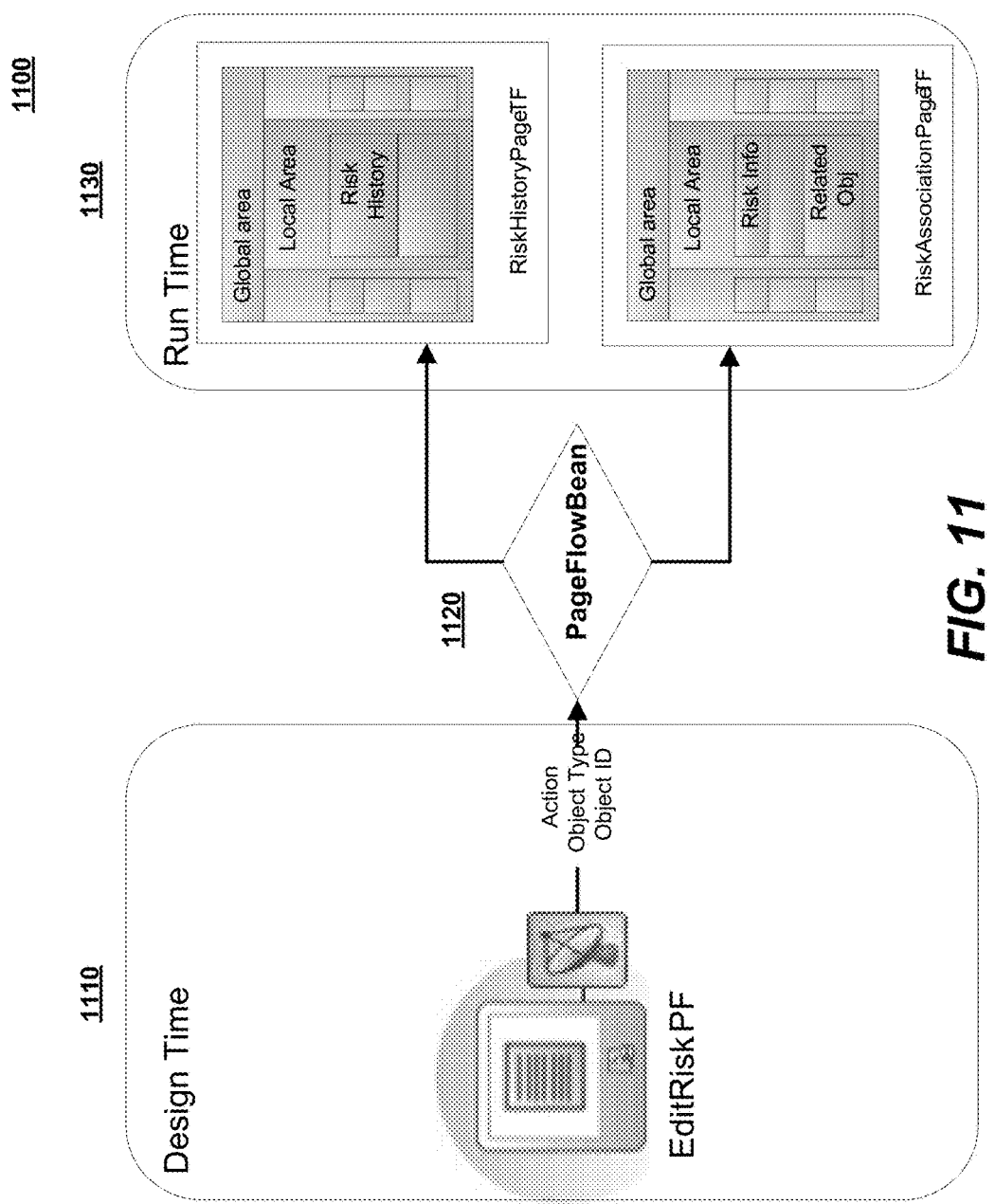
FIGS. 11 and 12 are schematic diagrams illustrating an application flow, according to one embodiment of the present invention.
Figure 12:
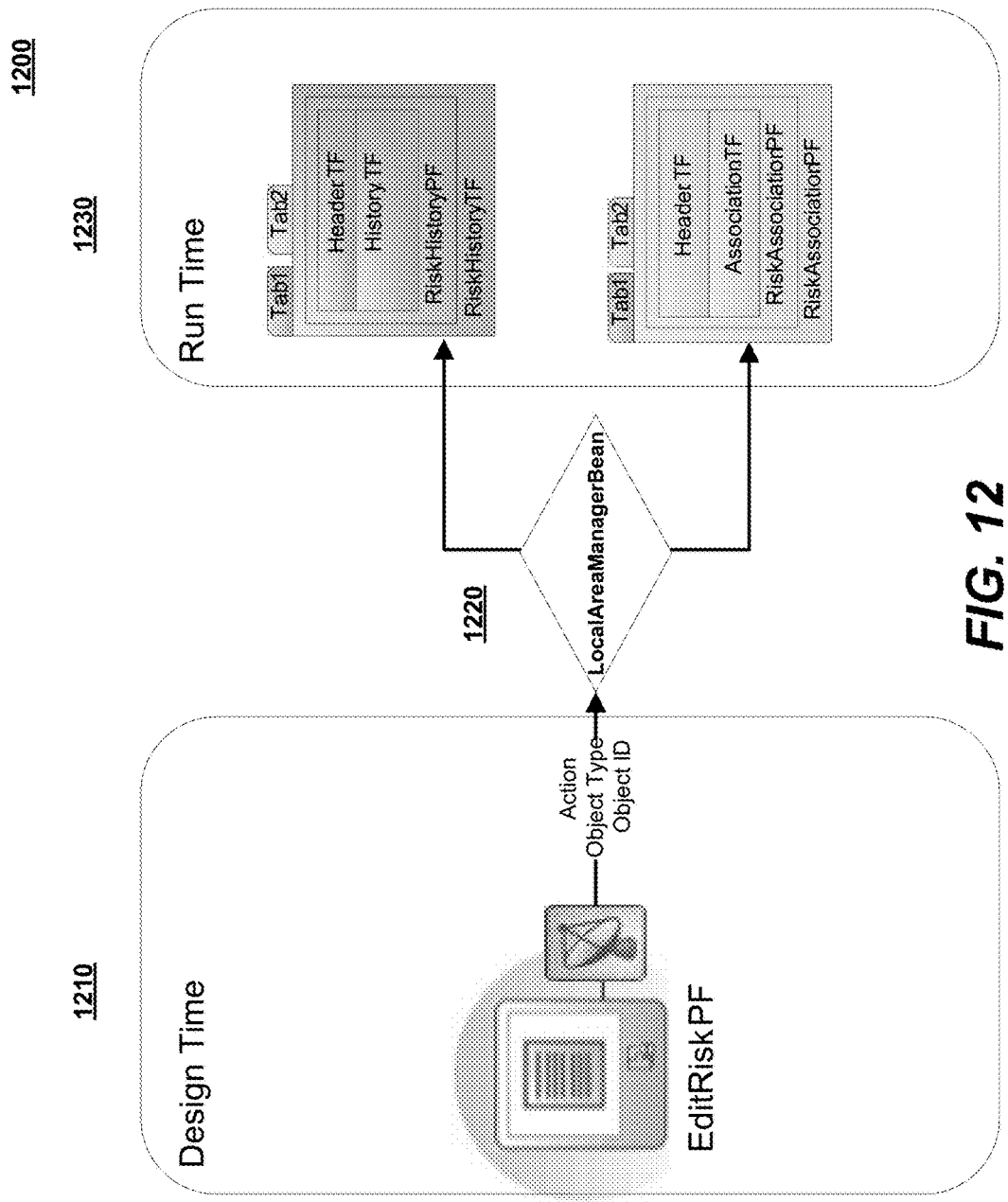

FIGS. 11 and 12 are schematic diagrams illustrating additional examples of an application flow. In FIG. 11, decision flow router 1120 (e.g., can be contained within controller module 520) invokes PageFlowBean to determine whether a page 1130 will include risk history or risk association. In FIG. 12, decision flow router 1220 invokes LocalAreaManagerBean to determine whether to render a page within an existing tab (e.g., Tab1), or on a new tab (e.g., Tab2). One or more beans can be used to make decisions.

As an additional option, error handling can be implemented within page composition during runtime. When an error is encountered, a bean (e.g., PageComposerBean) can return a value (e.g., PlaceHolderFlow) which is empty and will not occupy any space when an application page is rendered.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
   at least one computer receiving first user input identifying a specific task flow selected from among a plurality of task flows displayed for selection via a first box, each task flow comprising a set of activities to be performed in an executing application specific to a process and controlled by a routing diagram;
   said at least one computer associating multiple task flows with corresponding multiple regions within a single application page in a user interface of the executing application, the specific task flow among the multiple task flows being selected by the first user input in said single application page for use in rendering a specific region among the multiple regions, each region among the multiple regions in the single application page acting as a container for execution of a corresponding task flow, the multiple regions being rearrangeable and sizeable on the single application page in a visual manner;

wherein the specific task flow binds to the specific region of the single application page;

said at least one computer displaying at least a second box comprising a name of the specific task flow and a table of the specific task flow, the table comprising a first column displaying names of input parameters of the specific task flow and a second column displaying values for the input parameters;

said at least one computer receiving second user input identifying at least the specific task flow displayed in the second box;

said at least one computer storing in a database in one or more non-transitory computer-readable media, page composition metadata describing at least one relationship of an activity in the specific task flow within the specific region of the single application page; and said at least one computer presenting a plurality of application pages in the user interface of the executing application;

wherein the plurality of application pages comprise the single application page and are automatically composed at runtime on-the-fly according to at least the page composition metadata and an application flow based on user-defined metadata, without shutting down the executing application to reflect any page and flow change, the application flow being responsive to third user input related to the activity included in the single application page, and after receipt of the third user input, the user-defined metadata being automatically used to decide which of multiple new pages is to be displayed after the single application page.

2. The method of claim 1, wherein the each task flow is identified by a URL (universal resource locator) address.

3. The method of claim 1, wherein the receiving and the associating are performed at design time.

4. The method of claim 1, wherein the specific region includes a graphical component or a textual component to receive user interaction related to the activity.

5. The method of claim 1, wherein a variation in the plurality of application pages is responsive to metadata.

6. The method of claim 1 further comprising:
displaying, in the table of the specific task flow, a third column including classes of the input parameters of the specific task flow;
wherein live updates that occur, while the executing application is running, are presented in the multiple new pages;
wherein the plurality of application pages comprise:
a page to show a worklist;
a page to display search information;
a page to display control information;
a page to display controls; and
a page to display control history;
wherein the plurality of application pages are presented in one of:
a browser window;
a desktop window; or
an application window;
wherein the specific region includes a graphical component or a textual component to receive user interaction related to the activity; and
wherein a variation in the plurality of application pages is responsive to metadata.

7. The method of claim 1 wherein:

the user-defined metadata is automatically used by a decision flow router to decide which of the multiple new pages is to be displayed after the single application page.

8. One or more non-transitory computer-readable media containing program instructions which when executed by one or more processors, cause the one or more processes to perform a method, the method comprising:

said one or more processors receiving first user input identifying a specific task flow selected from among a plurality of task flows displayed for selection via a first box, each task flow comprising a set of activities to be performed in an executing application specific to a process and controlled by a routing diagram;

said one or more processors associating multiple task flows with corresponding multiple regions within a single application page in a user interface of the executing application, the specific task flow among the multiple task flows being selected by first user input in said single application page for use in rendering a specific region among the multiple regions, each region among the multiple regions in the single application page acting as a container for execution of a corresponding task flow, the multiple regions being rearrangeable and sizeable on the single application page in a visual manner;

wherein the specific task flow binds to the specific region of the single application page;

said at least one or more processors displaying at least a second box comprising a name of the specific task flow the second box displaying a name of the specific task flow and a table of the specific task flow, the table comprising a first column displaying names of input parameters of the specific task flow and a second column displaying values for the input parameters;

said one or more processors receiving second user input identifying at least the specific task flow displayed in the second box;

said one or more processors storing in a database in one or more non-transitory computer-readable media, page composition metadata describing at least one relationship of an activity in the specific task flow within the specific region of the single application page; and said one or more processors presenting a plurality of application pages in the user interface of the executing application;

wherein the plurality of application pages comprise the single application page and are automatically composed at runtime on-the-fly according to at least the page composition metadata and an application flow based on user-defined metadata, without shutting down the executing application to reflect any page and flow change, the application flow being responsive to third user input related to the activity included in the single application page, and after receipt of the third user input, the user-defined metadata being automatically used to decide which of multiple new pages is to be displayed after the single application page.

9. The computer readable medium of claim 8, wherein the each task flow is identified by a URL (universal resource locator) address.

10. The computer readable medium of claim 8, wherein the receiving and the associating are performed at design time.

11. The computer readable medium of claim 8, wherein the presenting is performed on-the-fly at runtime.

12. The computer readable medium of claim 8, wherein the region includes a graphical component or a textual component to receive user interaction related to the activity.

13. The computer readable medium of claim 8, wherein a variation in the plurality of application pages is responsive to metadata.

14. The computer readable medium of claim 8 wherein:
the user-defined metadata is automatically used by a decision flow router to decide which of the multiple new pages is to be displayed after the single application page.

15. A system comprising one or more processors coupled to a memory, the memory comprising software for composing application pages, the system comprising:
- a first module configured to receive first user input identifying a specific task flow selected from among a plurality of task flows displayed for selection via a first box, each task flow comprising a set of activities to be performed in an executing application specific to a process and controlled by a routing diagram, multiple task flows being associated by one or more processors with corresponding multiple regions within a single application page in a user interface of the executing application, the specific task flow among the multiple task flows being selected by the first user input in said single application page for use in rendering a specific region among the multiple regions, each region among the multiple regions in the single application page acting as a container for execution of a corresponding task flow, the multiple regions being rearrangeable and sizeable on the single application page in a visual manner;
- a second module configured to display at least a second box comprising a name of the specific task flow and a table of the specific task flow, the table comprising a first column displaying names of input parameters of the specific task flow and a second column displaying values for the input parameters, the second module being configured to receive second user input identifying at least the specific task flow displayed in the second box, the specific task flow binding to the specific region of the single application page;
- a controller module, coupled in communication to the first module, a decision flow router configured to store in a database, page composition metadata describing at least one relationship of an activity in the specific task flow within the specific region of the single application page, the decision flow router configured to present a plurality of application pages in the user interface of the executing application;
wherein the plurality of application pages comprise the single application page and are automatically composed at runtime on-the-fly according to at least the page composition metadata and an application flow based on user-defined metadata, without shutting down the executing application to reflect any page and flow change, the application flow being responsive to third user input related to the activity included in the single application page, and after receipt of the third user input, the user-defined metadata being automatically to decide which of multiple new pages is to be displayed after the single application page;
wherein at least one of the first module, the second module and the controller module comprises a processor coupled to a non-transitory computer-readable medium.

16. The system of claim 15, wherein the each task flow is identified by a URL (universal resource locator) address.

17. The system of claim 15, wherein a metadata database is configured to receive the plurality of task flows and the association of the multiple task flows with the multiple regions is performed at design time.

18. The system of claim 15, wherein the controller module is configured to present the plurality of application pages on-the-fly at runtime.

19. The system of claim 15, wherein the specific region includes a graphical component or a textual component to receive user interaction related to the activity.

20. The system of claim 15, wherein a variation in the plurality of application pages is responsive to metadata.

* * * * *